No. 757,640. PATENTED APR. 19, 1904.
G. ROUAIX.
TOO GREAT SPEED ALARM.
APPLICATION FILED MAR. 2, 1903.
NO MODEL. 5 SHEETS—SHEET 1.

Witnesses
C. E. Hunt.
L. O. Hilton.

Inventor
Gaston Rouaix
By H. B. Willson
Attorney

No. 757,640. PATENTED APR. 19, 1904.
G. ROUAIX.
TOO GREAT SPEED ALARM.
APPLICATION FILED MAR. 2, 1903.
NO MODEL. 5 SHEETS—SHEET 2.

No. 757,640. PATENTED APR. 19, 1904.
G. ROUAIX.
TOO GREAT SPEED ALARM.
APPLICATION FILED MAR. 2, 1903.
NO MODEL. 5 SHEETS—SHEET 3.

Witnesses.
C. E. Hunt
L. O. Hilton

Inventor.
Gaston Rouaix
By H. B. Willson
Attorney.

No. 757,640. PATENTED APR. 19, 1904.
G. ROUAIX.
TOO GREAT SPEED ALARM.
APPLICATION FILED MAR. 2, 1903.
NO MODEL. 5 SHEETS—SHEET 4.

Witnesses.

Inventor
Gaston Rouaix

No. 757,640. PATENTED APR. 19, 1904.
G. ROUAIX.
TOO GREAT SPEED ALARM.
APPLICATION FILED MAR. 2, 1903.
NO MODEL. 5 SHEETS—SHEET 5.

Witnesses:
E. E. Hunt.
L. O. Hilton.

Inventor
Gaston Rouaix
By H. B. Willson.
Attorney

No. 757,640. Patented April 19, 1904.

UNITED STATES PATENT OFFICE.

GASTON ROUAIX, OF PARIS, FRANCE.

TOO-GREAT-SPEED ALARM.

SPECIFICATION forming part of Letters Patent No. 757,640, dated April 19, 1904.

Application filed March 2, 1903. Serial No. 145,771. (No model.)

*To all whom it may concern:*

Be it known that I, GASTON ROUAIX, engineer, a citizen of the Republic of France, and a resident of 17 Rue d'Orleans, Neuilly, Paris, France, have invented certain new and useful Improvements in Speed-Indicators for Vehicles, of which the following is a specification.

This invention has for its object to provide an improved speed-indicator which may be set to give an alarm when the vehicle reaches a predetermined rate of speed to restrain the driver from infringing the proper regulations.

The speed-indicator to which this invention relates comprises in principle a driving-shaft connected to a wheel of the vehicle, a clutch-sleeve slidably mounted on the said shaft, a centrifugal device operated by the shaft and connected to the said sleeve to move the same in correlation with the speed of the shaft, an indicating device connected to the said sleeve to show at the outside of the apparatus the movements of the sleeve along the shaft, and consequently the speed of the latter, in combination with a second sleeve loosely mounted on the shaft, means for bringing this sleeve to a stop in several determined positions on the shaft, an indicating device connected to the said sleeve to show at the outside of the apparatus the position of the sleeve on the shaft, and a speed-alarm connected to the latter sleeve, the result being that the said alarm is operated by the second sleeve when the speed of the shaft is sufficiently great to cause the regulating device to move the first sleeve into contact with the second sleeve.

My invention further consists in the construction and combination of devices hereinafter described and claimed.

I have shown in the accompanying drawings two forms of my improved speed-indicator.

Figure 1:
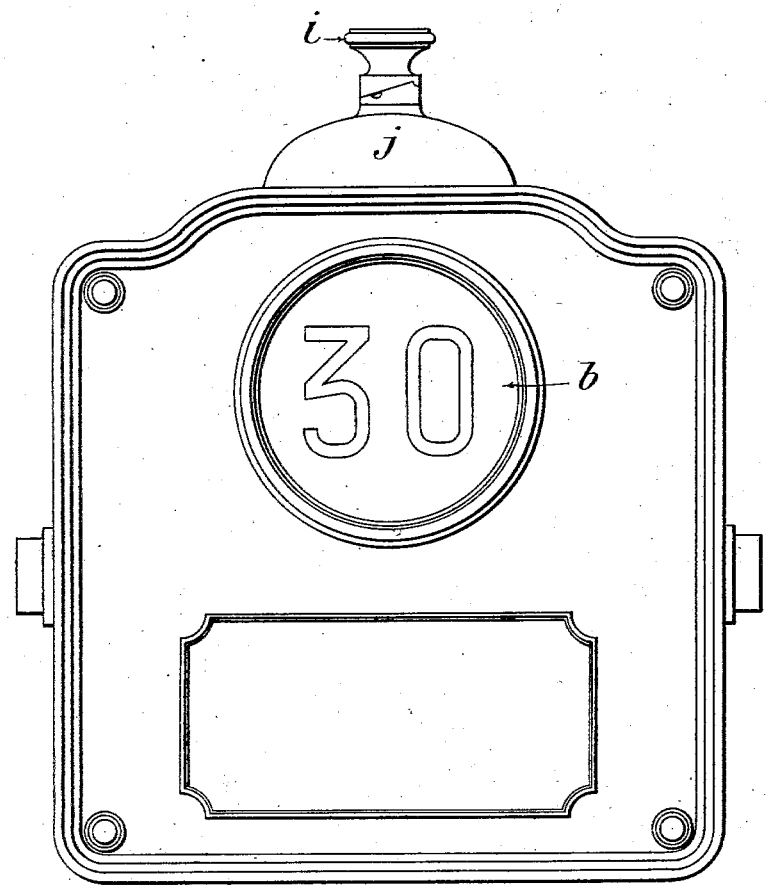
Figure 2:
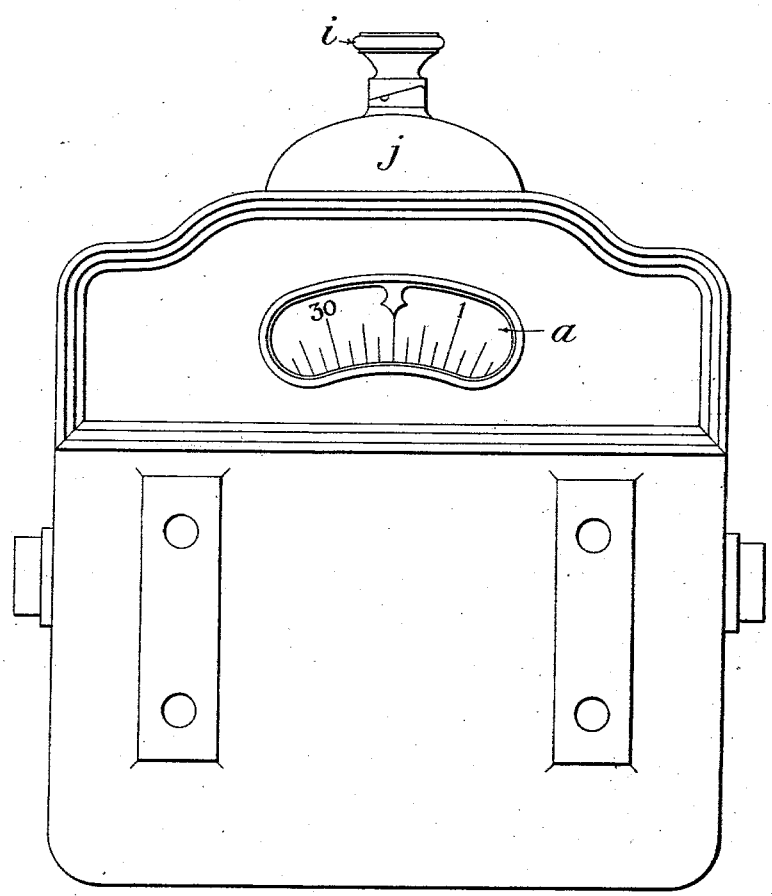
Figure 3:
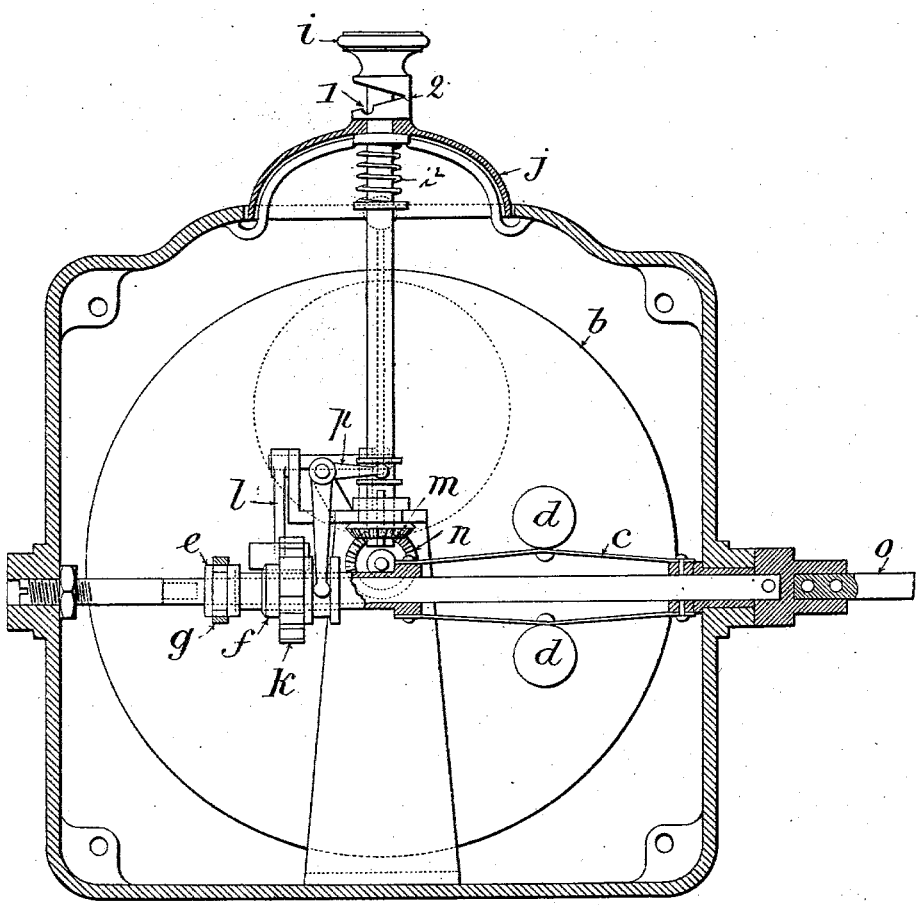
Figure 4:
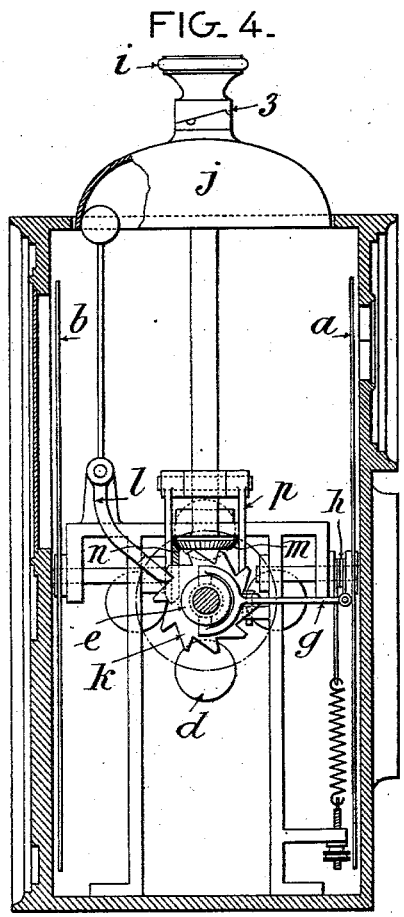
Figure 5:
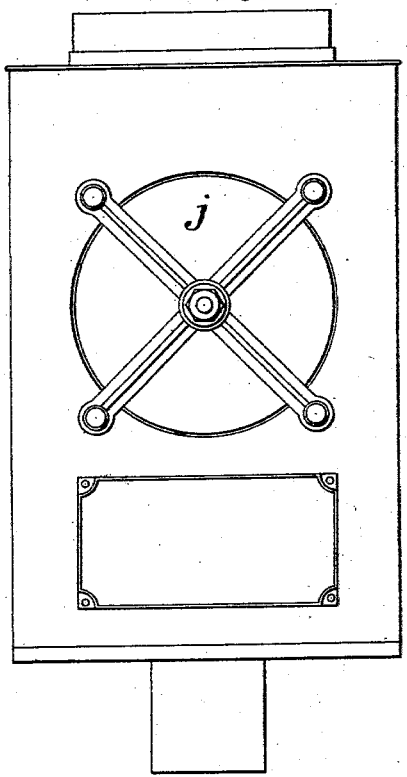
Figure 6:
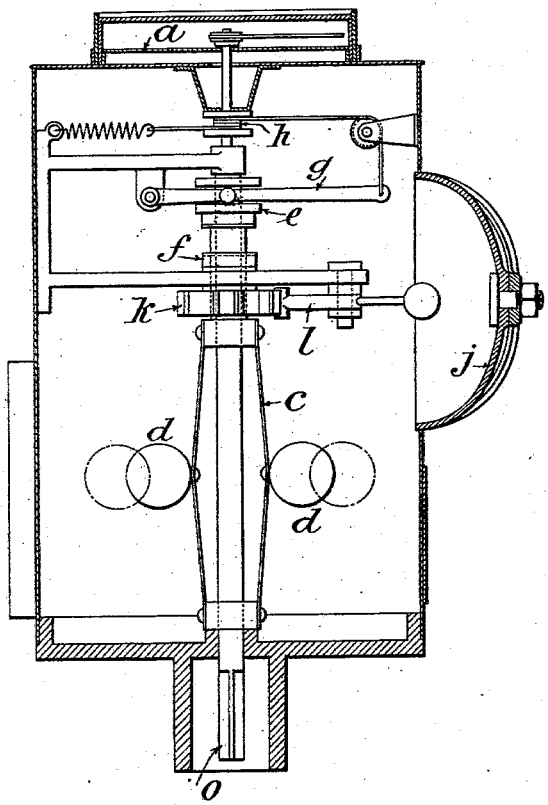

Figure 1 is a front view of the first form of my invention, showing the device stopped to give warning when the speed will have reached over thirty kilometers per hour. Fig. 2 is a rear elevation showing the dial informing the driver at what speed he is running. Fig. 3 is a longitudinal section of the apparatus. Fig. 4 is a transversal section of the same. Fig. 5 is an outside view of the second form of the apparatus. Fig. 6 is a section of the same.

The disk $a$, showing the speed per kilometer or other unit of measure per hour, is preferably made of enameled or other sheet metal, is put in motion by means of a regulator having a centrifugal device comprising metallic strips $c$ and weight-balls $d$, attached to the central portions thereof. The movement of rotation in moving the balls away from each other causes a lateral movement of the clutch $e$, to which the strips $c$ are attached. The clutch $e$ by means of a lever $g$ pulls upon a string wound on the pulley $h$, fixed to the disk $a$, showing the speed, and causes said disk to turn. The said disk $a$ has graduations showing tenths of a kilometer or any other fraction of a kilometer or meter, according to the requirements of the apparatus. The regulator $c$ is operated by a device $o$, either rigid or flexible, as may be required, and which receives its motion either from the front or the hind wheels of the vehicle or by any other suitable means, according to the fittings of the vehicle, whether tricycle, motocycle, automobile, street-car, or any other motor-vehicle.

On the disk $b$, showing the regulation speeds at which the apparatus is set to run, are given the numbers "12," "20," and "30," having each a distinct color. For instance, speed No. 12 is inscribed in white figures on a green ground. The disk $b$ is moved by means of the milled button $i$, which has three notches 1, 2, and 3, corresponding to the speeds "12," "20," and "30" and serving to regulate the distance between the clutches $e$ and $f$, it being understood that my invention is not limited to the speeds "12," "20," and "30" kilometers per hour.

The signal of alarm must work when one of the speeds "12," "20," or "30" for which the apparatus is set is exceeded. It is represented in the accompanying drawings by a bell $j$; but I reserve to myself the right of modifying the signal and of using as a substitute for the bell a horn or any other suitable signal of alarm.

The signal of alarm is operated when on account of its having been moved sidewise the clutch $e$ comes into contact with the clutch $f$, causing the latter to turn with it, and hence to also rotate the ratchet-wheel $k$. The latter is in engagement with the lever $l$, which it vibrates, causing the hammer on said lever to strike and sound the bell-signal. This occurs when the speed for which the device has been set is exceeded.

The distance between the clutches $e$ and $f$ is regulated by means of the milled button $i$, which acts, on the one hand, on the clutch $f$, through the medium of the lever $p$, and, on the other hand, on the pinions $m$ and $n$, serving to operate the disk $b$, showing the speeds at which the apparatus is set to run. The rod $i'$, to which the button $i$ is attached, is splined to and slidable on the pinion $m$, as shown in Fig. 3. A spring $i^2$ on the said rod $i'$ coacts with the notches 1 2 to lock the button, and hence the clutch $f$, at any desired adjustment.

In the modified form of my invention shown in Figs. 5 and 6 the driving-shaft is arranged vertically instead of horizontally, but the connected parts are similar to those previously described and operate in the same way. They are shown by the same reference-letters. The dial-disk $a$ is located on the top of the apparatus, so as to lie directly under the eyes of the driver.

Having thus fully described my invention, what I claim as new, and desire to secure by Letters Patent, is—

1. An apparatus of the class described comprising a driving-shaft, a clutch-sleeve slidably mounted on the said shaft, a centrifugal device operated by the shaft and connected to the said sleeve to move the same in correlation with the speed of the shaft, an indicating device connected to the said sleeve to show at the outside of the apparatus the movements of the sleeve along the shaft and consequently to show the speed of the said shaft, in combination with a second sleeve loosely mounted on the shaft, means to bring the said sleeve to a stop in several determined positions on the shaft, an indicating device connected to the said sleeve to show at the outside of the apparatus its position on the shaft, and a speed-alarm connected to the last-mentioned sleeve, the result being that the said speed-alarm is operated by the second sleeve when the speed of the shaft is sufficiently great to cause the regulating device to move the first sleeve into contact with the second sleeve.

2. An apparatus of the class described, comprising a driving-shaft, a sleeve slidably mounted on the shaft, a ball-regulator mounted on the shaft and connected to the said sleeve, a neck or groove formed on the sleeve, a forked lever engaged in the said groove, a graduated disk mounted on a stud or pivot, a pulley on the said disk, a spring, a string connecting the said lever to the said spring in passing over the pulley, in combination with a second sleeve loosely mounted on the shaft, a groove on the said sleeve, a forked lever engaged in the said groove, means for fixing at will the said lever in several determined positions, projections on the second sleeve, a lever operated by the said projections and a bell arranged to be struck and rung by the said lever.

In testimony that I claim the foregoing as my invention I have signed my name in presence of two subscribing witnesses.

GASTON ROUAIX.

Witnesses:
ALEXANDRE CHOVET,
AUGUSTE MOUSSEAU.